(No Model.) 3 Sheets—Sheet 1.

C. SOOYSMITH.
TUNNELING APPARATUS.

No. 340,161. Patented Apr. 20, 1886.

(No Model.)  3 Sheets—Sheet 2.

C. SOOYSMITH.
TUNNELING APPARATUS.

No. 340,161.   Patented Apr. 20, 1886.

WITNESSES:
A. Schehl.
Hampen Pink

INVENTOR
Charles Sooysmith
BY Briesen & Steele
ATTORNEYS.

(No Model.)

3 Sheets—Sheet 3.

C. SOOYSMITH.
TUNNELING APPARATUS.

No. 340,161. Patented Apr. 20, 1886.

WITNESSES:
A. Schehl.

INVENTOR
Charles Sooysmith
BY Briesen & Steele
ATTORNEYS

UNITED STATES PATENT OFFICE.

CHARLES SOOYSMITH, OF NEW YORK, N. Y.

TUNNELING APPARATUS.

SPECIFICATION forming part of Letters Patent No. 340,161, dated April 20, 1886.

Application filed January 22, 1886. Serial No. 189,367. (No model.)

*To all whom it may concern:*

Be it known that I, CHARLES SOOYSMITH, of the city, county, and State of New York, have invented an Improved Tunneling Apparatus and Process, of which the following is a complete specification, reference being had to the accompanying drawings, in which—

Figure 1:
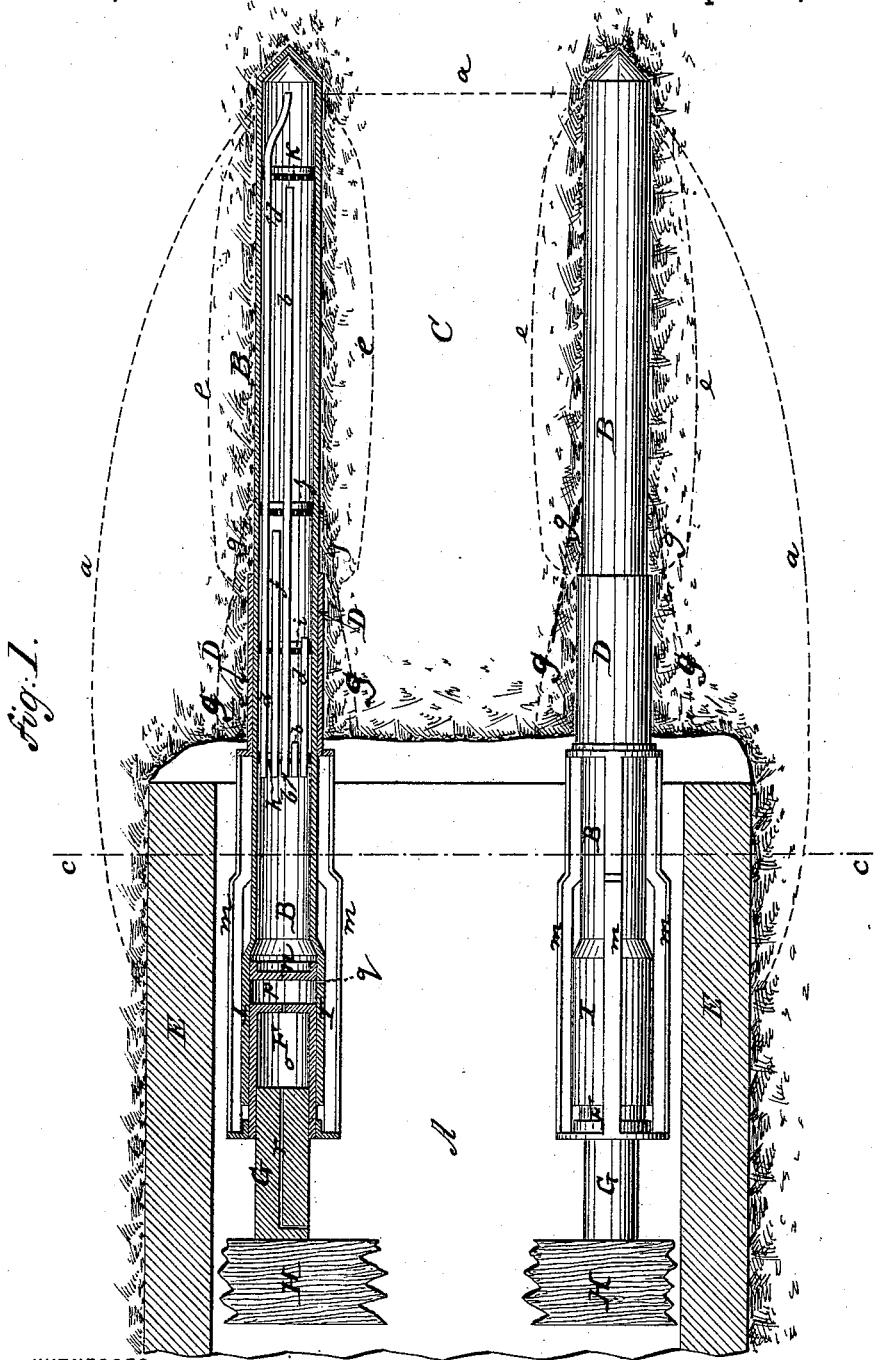
Figure 2:
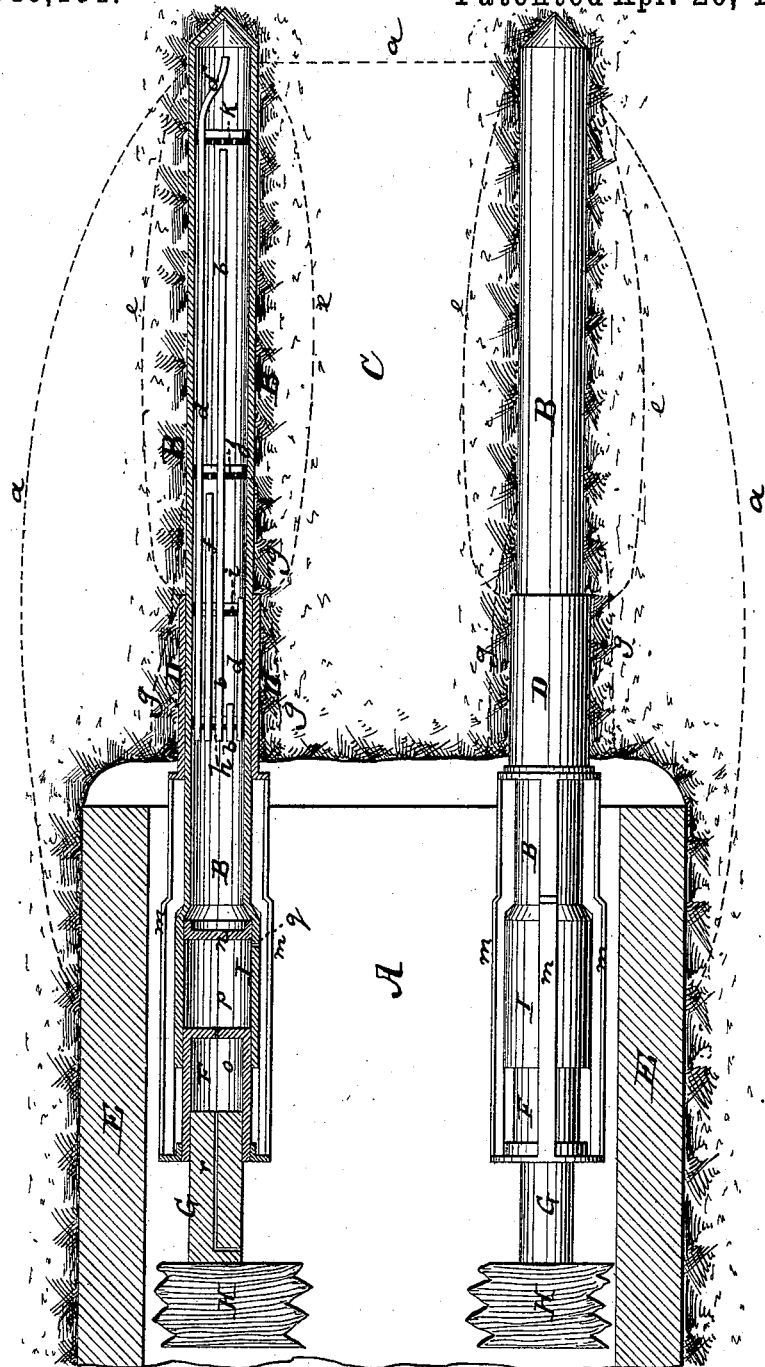
Figure 3:
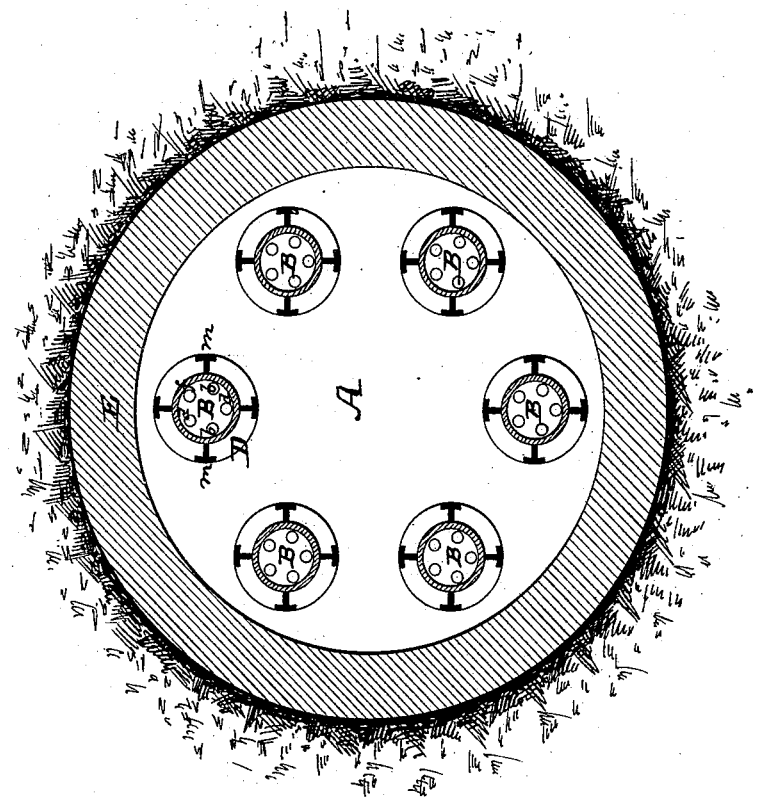

Figure 1 is a sectional view of part of a tunnel, showing my apparatus in position. Fig. 2 is a similar section showing the parts in a different position. Fig. 3 is a cross-section on the line $c\ c$, Fig. 1.

This invention relates to improvements in apparatus for tunneling in quicksand or mud, which apparatus is intended to solidify by freezing sufficient of the material as to allow the tunneling operations to be carried on without interruption.

Before my invention the idea had already been suggested of solidifying quicksand and the like by freezing, for the purpose of sinking shafts, tunneling, &c.; but I find that for constructing a tunnel of a greater length than the freezing-pipes it becomes necessary from time to time to advance these pipes or insert new ones, in order to be able to progress with the work of excavating.

My invention consists, principally, in providing the freezing-pipes with contrivances by which they can become thawing-pipes, and with other mechanism, hereinafter described, which will permit their ready advancement through the ground.

In the drawings, the letter A represents a part of a tunnel, and B B are the freezing-pipes, which are inserted in the soil C, for the purpose of solidifying it, so that the tunnel may be advanced by working in the frozen material.

The lines $a$ in Fig. 1 show the extent to which the soft soil is supposed to be frozen or solidified by the freezing-fluid, which at the proper time is caused to traverse the pipes B B. It will be readily understood that if I had only these freezing-pipes and means to utilize them as such they could not be pushed forward in the soil, unless the head of the tunnel or excavation was advanced to the limit of the frozen portion of the ground, in which case the soft character of the soil at or very near to the heading would be liable to fall into the excavation and seriously check the progress of the work. My intention is, for the purpose of obviating this difficulty and permitting the pipes B B to be advanced through the frozen portion of the ground, to provide the pipes with means for thawing their immediate surroundings, so that there would be produced around each of the pipes B B a zone of softened or thawed material, through which such pipes could be pushed forward, while the bulk of the soil would remain frozen.

The tubes $b\ b$, which are shown in the upper pipe B, Fig. 1, indicate the conduits for the freezing-fluid, which, when passed through the pipes B B, will cause the soil to freeze up to the line $a$. The tubes $d\ d$ in the upper pipe B, Fig. 1, indicate the conduits for letting a thawing-fluid into the pipe B, and when this thawing-fluid is allowed to circulate each pipe B will be surrounded by a zone, $e$, of thawed ground, through which the said pipes can now be pushed forward as far as desired, whereupon the thawing process is stopped and freezing is resorted to, to permit the tunnel or excavation to be carried farther on.

It will be perceived from an inspection of the drawings that the thaw-line $e$ around each pipe B does not extend fully to the head of the tunnel or excavation, and that, therefore, there is no danger of the heading falling in because softened by the thawing.

Encircling each pipe B for some distance from the heading into the frozen mass is a sleeve, D. Whenever the thawing-pipes $d$ are made use of to produce the zones $e\ e$ of softened matter, the pipes B B are pushed forward the desired distance by hydraulic or other pressure. The vehicle of heat not having circulated near the heading, the frozen mass remains as such at the heading, and each pipe B, when pushed forward, moves through the sleeve D that surrounds it, and that prevents the thawed material about the pipe B from coming into the excavated space. After the material about a pipe B has been again frozen some distance beyond the sleeve, the ground immediately around each sleeve is slightly thawed by using a shorter pipe, $f$, as a conduit for the heating-fluid, and, pressure being applied to the sleeve, this, too, can now be pushed forward. The sleeves D D may be dispensed with where the soil is of a muddy nature, because in that case the muddy material, owing to its semi-solid consistency, will not flow backward along the pipes B B, even if the ground immediately around them is thawed to permit their advancement. When the pipes B B, with or without the sleeves D D, have been moved forward, the excavation is also carried forward, and the lining E built before the frozen mass near the unwalled excavated space can thaw. With a small tunnel one pipe B will suffice. I may, if found desirable, provide a means of drilling through the pipe B without changing materially the arrangement described, or I may arrange a jet of water to play against the material at the end of the pipe B while the latter is being pushed forward.

It will be seen from the foregoing description that where the sleeves D D are used there are three operations of thawing and freezing, namely:

First. The ground is frozen to the lines a. This is done by using the pipes b as conduits for the freezing-fluid.

Second. The ground is thawed around each pipe B up to the limits e, and the pipes B B are then pushed forward.

Third. The ground is thawed around each sleeve D up to the limit g, and the sleeves D D are then pushed forward. Afterward the ground is again frozen around the pipe and sleeve.

The constructing of each pipe B to permit the three operations just mentioned is preferably as follows:

Each pipe has a series of transverse diaphragms, four being shown at h, i, j, and k. The front three diaphragms, i, j, and k, have a number of small holes in them. The freezing-fluid supply-tube b terminates in the space between the diaphragms j and k, and has at its back end a suitable connection with the source of supply. The freezing-fluid escapes, when desired, through the shorter tube b. Suitable valves or cocks should be in said tubes to allow each to be opened or closed when desired.

For the second operation I supply thawing mixture through the longer tube, d, which reaches nearly to the end of the pipe B, the fluid escaping through the short tube d.

For the third operation—that is, thawing around and in advance of the sleeve—I supply the thawing-fluid through the tube f and take it out by the shorter tube, b; but this arrangement of tubes may be varied and the several fluids may be supplied to the pipe B by the shorter tubes and taken out by the longer tubes, if desired. If preferred, the diaphragms i, j, and k may be made tight, or extra pipes used to permit circulation in the main pipe B.

I have also shown a means of moving the pipes B and their sleeves D by hydraulic pressure. Each sleeve D connects by arms or rods m m with a cylinder, F, which partly embraces a stationary block, G, that is braced against or held firm by a stationary framework, H. Each pipe B terminates at its outer end—that is, the back end—by a cylinder, I, which embraces the cylinder F. There is a closed diaphragm, n, at the end of this cylinder I, at some distance from the end of the cylinder F. Thus there are two cylindrical spaces formed, the one, O, within the cylinder F between its end and the end of the block G, the other, p, within the cylinder I, between its end n and the end of the cylinder F. Whenever the pipe B has to be pushed into the soil, suitable fluid is forced into the space p through the aperture q, the cylinder F being held stationary meanwhile by stopping the passage r in the block G. Whenever the sleeve D is to be moved the fluid is forced into the spaces o through the passage r.

The passage shown in the drawings between the cylinders o and p is plugged up when the machine is in operation.

I desire it to be understood that when I mention a tunnel in this specification I mean any excavation in a horizontal, vertical, or other direction of any kind whatsoever to which the invention described is applicable.

The process herein described will be made the subject of another application for a patent.

I claim—

1. The freezing-pipes B, provided with conduits for freezing-fluids and for thawing-fluids, substantially as and for the purpose described.

2. The pipe B, provided with conduits for freezing-fluids and for thawing-fluids, combined with the sleeve D, substantially as described.

3. The pipe B, having transverse partitions combined with the conduits b, d, and f, and with the sleeve D, substantially as described.

4. The combination of the pipe B and sleeve D with the block G, cylinders F and I, and arms m, substantially as and for the purpose herein shown and described.

5. In the art of tunneling through quicksand or soft soil, the pipe B, provided with inner conduits, all arranged so that a vehicle of cold and a vehicle of heat can be circulated successively through desired portions of said pipe for alternately freezing and thawing around said pipe, as specified.

6. The combination of a pipe for freezing the soil to be tunneled with a pipe for thawing the soil around said freezing-pipe, substantially as herein shown and described.

CHARLES SOOYSMITH.

Witnesses:
CHARLES G. M. THOMAS,
HARRY M. TURK.